July 14, 1936.  W. WOELFLIN  2,047,538
CLOSED TYPE DEHYDRATOR AND METHOD
Filed June 16, 1933
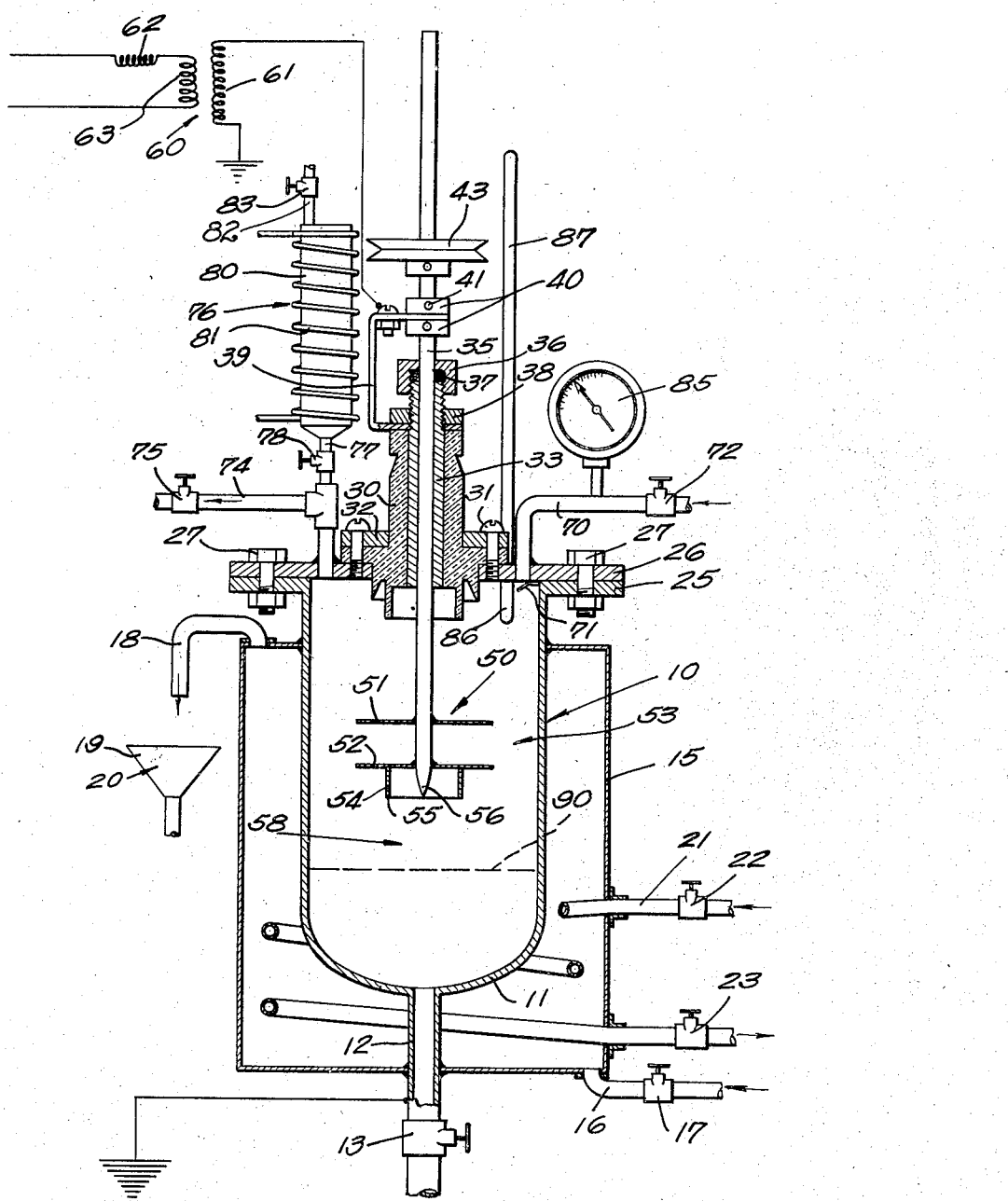
INVENTOR:
WILLIAM WOELFLIN,
By
ATTORNEY.

Patented July 14, 1936

2,047,538

UNITED STATES PATENT OFFICE 2,047,538

CLOSED TYPE DEHYDRATOR AND METHOD

William Woelflin, Long Beach, Calif., assignor to Petroleum Rectifying Company of California, Los Angeles, Calif., a corporation of California Application June 16, 1933, Serial No. 676,123

13 Claims. (Cl. 204—24)

My invention relates to a method and apparatus for electrically treating emulsions. While the invention finds particular utility in the field of testing such emulsions to obtain an accurate determination of the physical factors and quantities of the constituents, neither the process nor the apparatus is limited to this use, though the invention will be described in detail in conjunction with such a testing process.

It is often difficult to accurately determine the relative amounts of the constituents present in an emulsion. Thus, the conventional crude oil emulsion coming from most oil wells contains oil and water in varying proportions, and difficulty has been encountered in accurately determining the relative amounts of these liquids. From the standpoint of production it is desirable to be able to accurately ascertain this information. Various methods have heretofore been used in an attempt to obtain an accurate determination. Thus, one method involves subjecting the emulsion to high centrifugal force to separate the constituents. Such a method not only involves a considerable period of time, but in many instances is relatively inaccurate. The second method sometimes used is to heat the emulsion to such a degree that the water is distilled off, this water being subsequently condensed and measured. Certain of the lighter hydrocarbons of the petroleum are also driven off and it is difficult to obtain an accurate determination, especially where the water content of the emulsion is relatively high.

It is an object of the present invention to provide an electrical method whereby the relative proportions of the constituents of the emulsion can be ascertained more accurately than possible with existing centrifugal and distillation processes.

A complete separation of the oil and water phases is further desirable from the standpoint of analysis of these individual phases. Thus, it is difficult with existing processes to obtain accurate knowledge of the true gravity of the oil phase of an emulsion. If a distillation test is utilized certain of the lighter fractions are driven off and the final gravity determination is in error.

It is another object of the present invention to provide a method of testing an emulsion which effects a separation of the phases without materially changing the properties of the materials forming these phases.

It is another object of the invention to confine a body of emulsion in a closed space and to subject this emulsion to the action of an electric field, retaining in this closed space any gaseous products formed prior to or during the treatment.

A further object of the invention is to provide an electric treating process wherein such gaseous products are subjected to a cooling action tending to condense these products, the condensate being returned to the liquid in the closed space.

A further object of the invention is to provide a method and apparatus of treating under relatively high pressures by allowing the emulsion itself to build up the pressure in the container.

Still a further object of the invention lies in a method of treatment wherein preliminary treatment is effected in one field and subsequent treatment effected in another field, the second field increasing in intensity as treatment progresses.

Another object of the invention is to provide a method of treating in a space between an electrode and the surface of a body of conducting liquid, this surface being raised toward the electrode as treatment progresses.

Still a further object of the invention lies in the circulation of a gas through the upper portion of a treating space to remove air or other combustion-supporting gas therefrom.

Other objects of the invention lie in the provision of a novel apparatus wherein these methods can be conveniently performed.

It should not be understood, however, that my invention is limited to a method and apparatus for testing. Certain of the features herein disclosed find distinct utility in the electrical treatment of emulsions regardless of the disposition of the phases subsequent to treatment. Such commercial or semi-commercial adaptations of the process and apparatus will be apparent to those skilled in the art from the following description.

In the drawing, I have illustrated an apparatus of laboratory size suitable for testing emulsions. The same type of apparatus on a larger scale can be used for commercial treatment, using one or more of the treating steps to be hereinafter set forth.

Referring to the drawing, the apparatus includes a shell 10 including a rounded bottom 11 to which an outlet pipe 12 is connected, this pipe having a valve 13 therein. The shell 10 is positioned to extend in a tank 15 which is substantially filled with a heat-control medium which is preferably a liquid so that the shell is jacketed by this liquid. Ordinarily this liquid may comprise a body of water which may be moved thereinto through a pipe 16 including a valve 17. It is often desirable to circulate this water, and for this means I provide a discharge pipe 18 communicating with a funnel 19 of a drain 20. It is also desirable to be able to heat this liquid, and for this purpose I provide a heating coil 21 with valves 22 and 23 controlling a flow of heated material therethrough. Steam has been found to be a very satisfactory heating medium.

The upper end of the shell 10 is open and provides a flange 25 which supports a cover 26. This cover and its associated structure can thus be removed from the tank 10 as a unit, the cover, while in position, being clamped to the flange 25 by any suitable means such as the bolts 27 indicated.

An insulator 30 is detachably connected to the center portion of the cover 26 by any suitable means. As shown, this means includes a series of screws 31 extending through a plate 32 and being threaded into the cover 26 to clamp the insulator in place. A metallic sleeve 33 extends through the insulator and is retained therein, this sleeve journalling a rotatable rod 35. The upper end of the sleeve 33 is threaded to a packing nut 36 which compresses a packing 37 about the rod 35.

A nut 38 is also threaded to the upper end of the sleeve 33 and retains a contact spring 39 between itself and the upper end of the insulator 30. This contact spring extends upward and inward to surround the rod 35 between collars 40 held in place by set screws 41 so that the spring contact 39 is electrically connected to the rotatable rod 35. A pulley 43 or any other suitable means may be used for rotating this rod.

The electrode can be raised or lowered by loosening the set screws 41 in collars 40, sliding the electrode rod 35 through the collars 40 to the desired position, and again tightening the set screws 41.

The lower end of the rod 35 cooperates in forming an electrode structure 50. The exact form of this electrode structure may be varied to a suitable degree without affecting the operation. In the form shown the rod carries upper and lower discs 51 and 52 which cooperate with the inner wall of the shell 10 in defining a treating space 53. Depending from the lower disc 52 is a sleeve 54 of cylindrical shape and terminating in a lower edge 55. The lower end of the rod 35 is rounded or pointed to form a lower portion 56. The space immediately below the disc 52, the lower edge 55, and the lower portion 56 comprises a treating space 58.

Electric fields are established in the treating spaces 53 and 58 by the use of a suitable source of potential. This source is preferably, though not invariably, of the alternating current type and is shown as including a transformer 60 providing a secondary winding 61, one terminal of which is connected to the shell 10 through ground and the other terminal of which is connected to the spring contact 39. A choke coil 62 may be connected in series with a primary winding 63 of this transformer to limit the current.

A gas inlet pipe 70 communicates with the interior of the shell 10 through the cover 26, as shown, to supply gas thereto, the incoming gas being deflected by a deflector 71. A valve 72 controls the rate of flow of this gas. Gas may be withdrawn from the interior of the shell 10 through a gas outlet pipe 74 including a valve 75.

It is sometimes desirable, though not always necessary as will be hereinafter pointed out, to utilize a condenser 76 for condensing certain of the gases emanating from the interior of the shell 10. If utilized, this condenser may communicate with the pipe 74 through a pipe 77 including a valve 78. Other pipe means may be utilized which will conduct the gaseous products to the condenser 76 and return the condensate to the interior of the shell 10. In the form shown this condenser is diagrammatically indicated as comprising a tank 80 which is cooled by a cooling coil 81 which may be positioned either interiorly or exteriorly thereof. In practice any well-known type of condenser may be used. A draw-off pipe 82 including a valve 83 may be utilized to remove any products non-condensable at the temperature of the condenser.

It is also desirable to know the temperature and pressure conditions in the shell 10. In this connection a pressure gauge 85 may be conveniently connected to the pipe 70 which is in open communication with the interior of the shell 10. A thermometer well 86 may extend into the shell 10, and a thermometer 87 lowered thereinto to indicate the temperature existing in the shell. Other heat-indicating means may be used to show the temperature of the bath and the vapors or condensate.

One mode of utilizing this apparatus in the testing of emulsions is as follows:

The shell 10 is filled with emulsion to a point within a fraction of an inch of the top. The cover 26 is then secured in place, and if desired, a stream of gas is forced through the upper portion of the shell 10 above the emulsion, this gas being controlled by the valves 72 and 75 and flowing through the pipes 70 and 74, the valve 78 being at this time closed. This gas is usually of an inert nature and is used for removing any air or other undesired gas from the upper portion of the treater before starting the test. This is necessary to eliminate any danger of explosion. It also permits the upper end of the shell 10 to be filled with any desired gas before starting the test. The valves 72 and 75 are then tightly closed. If desired the valve 75 may be closed first and an initial pressure can be built up in the shell 10 due to the gas pressure. This initial pressure will, of course, indicate on the pressure gauge 85. Usually, however, such an initial pressure is not necessary, in which event the gauge 85 will register substantially atmospheric pressure when the valves 72 and 75 are successively closed.

In the preferred embodiment of the process, the emulsion is introduced in a cool condition, heating thereof taking place after the cover 26 has been clamped in place. This heating may be accomplished by any suitable means such as by passing steam through the coil 21 shown. The degree to which the emulsion is heated varies between relatively wide limits. In testing California crude oil emulsions temperatures may range from 100° F. to a value slightly below the boiling point of the water phase. Temperatures of from 160° to 200° F. are usually satisfactory. With other emulsions, however, it is not essential to use such high temperatures. With some Texas oils, for instance, it is possible to eliminate the heating step entirely and test at room temperature.

As the oil is heated it will expand slightly. In addition, certain of the lighter fractions or hydrocarbons will be freed in the form of vapors which will move into the space above the emulsion. Both of these actions will, of course, increase the pressure in the shell 10. With a typical California emulsion the pressure in the shell 10 will be increased by this heating step to a value of approximately 15 pounds per square inch.

It is an important feature of this method of testing to retain the emulsion and these vapors in a closed shell means defining a closed space or chamber. If the valve 78 is closed, this closed space or chamber will include the interior of the shell 10 and the incidental piping between the shell and the valves 72, 75, 78. If, however, the valve 78 is open so as to utilize the condenser 76, this closed space or chamber will in addition include the closed chamber formed inside the condenser 76. In any event, however, the vapors are confined in contact with the emulsion so that these vapors do not escape into the atmosphere.

When the emulsion has reached the desired temperature, the valves 22 and 23 of the heating coil are closed and current is supplied to the transformer 60. This sets up a relatively intense field in the treating space 53, and a less intense field in the treating space 58. At this stage of the process the entire body of emulsion in the shell 10 is of a homogeneous character, and the field in the treating space 58 will be between the electrode 50 and the bottom 11 of the shell. These electric fields will coalesce the dispersed phase of the emulsion into masses of sufficient size to gravitate from the oil. These masses thus settle downward in the shell 10 and form a body of conducting liquid in the lower end thereof. As treatment progresses this body of conducting liquid increases in size so that the surface thereof, indicated by the numeral 90, gradually rises toward the lower portion of the electrode 50. It will thus be clear that the distance across the treating space 58 is decreased as treatment progresses, and that the field intensity therein will be increased as the surface 90 approaches the lower end of the electrode. Thus, as the material in the treating space 53 becomes drier, the emulsion undergoing treatment is subjected to an electric field of increasing intensity in the treating space 58. This also is a novel step in the dehydration art. It is, however, desirable that the surface 90 never rises to such an extent that it contacts the central electrode, and for this reason the vertical position of the central electrode is made adjustable by loosening the set screws 41 of the collars 40. The electrode structure is preliminarily adjusted so that when the entire body of water has separated, at least a fraction of an inch of space will exist between the surface 90 and the lower edge of the live electrode.

This treating action not only coalesces the dispersed phase, but liberates certain gaseous products from the emulsion. This will further increase the pressure in the closed space as high as 45 pounds per square inch in some instances. Thus, if the pressure in the shell 10 was substantially atmospheric after the preliminary circulation of gas, and if the heating step developed a pressure of 15 pounds per square inch, the pressure gauge 85 would then indicate a pressure as high as 60 pounds per square inch after these gaseous products are liberated. Treatment is carried on during the time that this high pressure exists.

The gaseous products thus liberated are composed in the main of the lighter fractions of hydrocarbons which have been liberated in the form of condensable vapors. These gaseous products also include a small quantity of fixed gas. It is desirable to condense at least a portion of the gaseous products and vapors driven off by the steps of heating and electrical heating. If this is done the liquids withdrawn after separation has been effected will be of the same composition as these liquids when in an emulsified state. It is preferable, however, not to condense these products until substantially complete separation has taken place in the shell 10. Thus, in the preferred mode of operation of the process the voltage is turned off and the material is allowed to settle at the treating temperature for from 10 to 30 minutes, after which the gaseous products are subjected to a condensing action. However, this order of procedure is not always essential.

In condensing these gaseous products two methods of operation are possible. If the condenser 76 is utilized, a cooling medium can be forced through the cooling coils 81 associated therewith, thus condensing at least a portion of the products, the condensate being returned to the shell 10 through the pipe 77. Usually, however, it is not essential to use a separate condenser, cooling water or other cooling medium being forced through the pipes 16 and 18 to cool the shell 10 and the material therein. This is preferably done after the current has been cut off, and results in a condensation of substantially all of the condensable products above the oil in the shell 10.

In either event this condensation step materially reduces the pressure in the shell 10. Usually, however, there is a slight excess pressure in the shell even after the material in the shell is reduced to atmospheric temperature, this slight excess pressure being due to the fixed gases which have been liberated. These gases are of very small quantity and may be released through the valve 75. It has been found that the small amount of fixed gases thus liberated from the oil during the treatment produces no measurable effect on the quality or quantity of the oil.

After the condensate has reached the oil in the shell 10, and after substantially complete separation has taken place therein, the valve 13 is opened to withdraw the lower body of water from the shell. The oil is later drawn off through the valve 13 and into a separate container. By measuring the relative amounts of oil and water and comparing these quantities, it is possible to obtain a determination of the water content of the original emulsion. This method of determination has been found to be much more accurate than existing methods.

In order to check the accuracy of the various methods of determining the water content of an emulsion, artificial emulsions have been made up in which the water contents were known. The results of the determination of water content of these artificial emulsions were as follows:

|  | Sample #1 | Sample #2 |
| --- | --- | --- |
|  | Percent | Percent |
| Actual water content as made up | 10.7 | 47.5 |
| Water content by centrifuge | 11.4 | 52.0 |
| Water content by distillation | 10.2 | 45.6 |
| Water content by electrical dehydration | 10.7 | 47.5 |

In addition, the oil thus drawn off may be analyzed to secure the properties of the oil phase of the emulsion. In this connection, it is clear that the composition of the oil withdrawn has not been measurably changed during treatment, and that the composition of the resulting oil corresponds to the composition of the oil phase. A gravity test of the oil thus withdrawn will give an accurate indication of the gravity of the oil phase in the emulsion. It will be noted that no diluent is involved in the process which would change the composition of the oil from its original composition when present in the emulsion.

In treating certain oils by this process it has been found that a small body of loose emulsion may settle between the body of water and the body of oil. If this is the case, the operator separately withdraws this loose emulsion through the valve 13 and subjects this small body of emulsion to any of the well-known methods of separating such emulsions. Thus, the emulsion being of a relatively loose character, centrifugal separation is usually effective, and the resulting oil and water phases are added to the quantities of oil and water withdrawn from the shell 10.

In other instances, it is entirely practical to prevent the formation of such an intermediate layer of loose emulsion by adding a small amount of chemical to the emulsion. Many well-known chemicals may be utilized to eliminate this sludge layer, such a chemical having the property of changing the interfacial tension of the emulsion. Many such chemicals which will eliminate sludge layers in electric dehydration processes are known. Chemicals which can be used to advantage are, for instance, phenol, toluidine, sulphonated hydrocarbons, modified fatty acids, certain of the commercially available chemicals for modifying or completely breaking an emulsion if applied in sufficient quantities, etc. While the addition of a chemical de-emulsifying agent will cause a slight discrepancy between the chemical properties of the phases and the chemical properties of the separated liquids, this addition of a chemical will not measurably affect the physical properties of the constituents. If the addition of such a chemical agent is undesirable, the sludge layer can be separated by centrifugal force, as set forth above, or by further electrical dehydration.

The current consumption of the apparatus will be decreased, and better action obtained, if the electrode 50 is rotated during treatment. The rotation of this electrode can also be made to effect a preliminary mixing of the emulsion with the chemical, and will set up a slight agitation during heating so as to uniformly heat all portions of the emulsion.

The building up of a relatively high pressure in the shell 10 seems to give a very complete separation and from this standpoint is very desirable in that lower cuts are obtained. Further, this pressure tends to prevent the giving off of vapors, so that at higher pressures the same temperature will not liberate as much vapor. In fact, by increasing the pressure to higher values it becomes possible to prevent any substantial amount of vapors being liberated, thus making the use of a condenser quite unnecessary.

Many of the features of this invention are not limited to a testing method or apparatus. Among such features which may be mentioned is the retention of the gaseous products in the vicinity of the emulsion during the time that it is undergoing treatment. It is new to so treat an emulsion in a closed container as to prevent escape of such products. So also, it is new to condense these products, returning the condensate to the treating space. Another new feature of general application is the circulation of gas through the upper portion of the treater to remove therefrom any air or other gas which might cause explosions. In addition, the method and apparatus of heating and cooling the shell and its contents are new in the dehydration art. So also, it is new to treat petroleum by building up a field of increasing intensity between the live electrode and a body of conducting medium. This is especially true when the lower field is increased in intensity as the oil in the other field becomes drier. This result is obtained in the present structure due to the settling out of the water phase and the consequent rise in level of the body of conducting liquid. Any treatment heretofore taking place between an electrode and the water level has taken place in a field of constant intensity, the water being withdrawn as fast as it settles out.

I claim as my invention:

1. A method of treating an emulsion, which method includes the steps of: heating a body of emulsion thereby driving off certain lighter fractions in the form of vapor; electrically treating said heated emulsion to form other gaseous products; cooling said vapor and said gaseous products to form a condensate; returning said condensate to the treated emulsion; separating the constituents of said emulsion; and removing any uncondensed products from the vicinity of said emulsion constituents.

2. A method of separating the phases of an emulsion, which method includes the steps of: confining a predetermined quantity of emulsion in a closed space; establishing an electric field in said body of emulsion to coalesce the dispersed phase of said emulsion and form gaseous products by action of said field; retaining said gaseous products in said closed space whereby the pressure therein is increased by the treating action of said electric field; gravitationally separating said phases in said closed space under the increased pressure therein; cooling said gaseous products after substantially complete separation of said phases has been effected in said closed space; and returning the condensate to said closed space so that said condensate unites with said separated phases.

3. A method of separating the phases of an emulsion, which method includes the steps of: confining a body of emulsion in a closed space; establishing an electric field in said body of emulsion to coalesce the dispersed phase of said emulsion and form gaseous products by action of said field; retaining said gaseous products in said closed space whereby the pressure therein is increased by the treating action of said electric field; allowing said phases to separate in said closed space while under the pressure built up therein by said gaseous products; and separately withdrawing said phases from said closed space.

4. A method of treating an emulsion, which method includes the steps of: confining a body of cool emulsion in a closed space; heating said emulsion in said closed space thus driving off the lighter fractions and increasing the pressure in said closed space to a primary degree, the degree of heat applied being insufficient to vaporize the dispersed phase of said emulsion; applying an electric field to said emulsion in said closed space, said field coalescing the dispersed phase of said emulsion and liberating gaseous products and thus further increasing the pressure in said closed space to a secondary degree; cooling said gaseous products and said lighter fractions to form a condensate which is returned to the liquid in said space, thus decreasing the pressure in said closed space; and separately withdrawing the phases of said emulsion from said space.

5. A method of quantitatively or qualitatively testing a predetermined quantity of emulsion by the use of a live electrode in the upper portion of a closed emulsion-containing space, which method includes the steps of: placing said quantity of emulsion in said closed space; building up an electric field in said closed space around said live electrode to preliminarily treat said emulsion by coalescing the dispersed phase of said emulsion, said dispersed phase comprising a conducting material and dropping to the bottom of said space to form a body of conducting liquid the surface of which rises toward said live electrode, said electric field liberating gaseous products which are retained in said closed space; establishing a potential difference between said live electrode and said body of conducting liquid whereby the electric field therebetween increases in intensity as said surface of said body of conducting liquid moves upward toward said live electrode and as the emulsion in said first-mentioned electric field becomes drier; cooling said closed space while all of the emulsion constituents and said gaseous products are retained therein, thereby condensing at least a portion of said gaseous products; returning the condensate to said emulsion constituents in said closed space; and withdrawing said body of conducting material after substantially complete coalescence has been effected in said electric fields.

6. A method of quantitatively or qualitatively determining the physical or chemical properties of the materials forming the continuous and dispersed phases of an emulsion, which method includes the steps of: treating a body of said emulsion in a closed space by heating said emulsion, applying pressure thereto, and subjecting said emulsion to the action of an electric field established in a treating space in said closed space under such conditions of heat and pressure, said treating action coalescing said dispersed phase and liberating condensable products; retaining said condensable products in said closed space; condensing said products and returning the condensate directly to the liquid in said treating space; and separating said coalesced phase from said continuous phase preparatory to individual testing of said phases.

7. In an emulsion-treating apparatus, the combination of: walls defining a closed space retaining a body of emulsion; means for heating said emulsion sufficiently to drive off certain of the lighter fractions thereof, all of said fractions being retained by said walls in said closed space to increase the pressure in said closed space; means for establishing an electric field in said closed space while said emulsion and said lighter fractions are retained therein, said means including electrode means in said closed space; means for cooling said closed space to condense at least a portion of said lighter fractions and to decrease the pressure in said closed space; means for removing any uncondensed products from said closed space; and means for withdrawing the constituents of said emulsion from said closed space.

8. In a device for quantitatively and qualitatively determining the phases of an emulsion, the combination of: closed shell means containing a predetermined quantity of said emulsion; means for heating said emulsion while in said shell means sufficiently to drive off certain of the lighter fractions, said lighter fractions being confined in said shell means to increase the pressure therein; means for establishing an electric field in said shell means of sufficient intensity to coalesce the dispersed phase of said emulsion and thereby allow gravitational separation of the emulsion phases in said closed chamber, said lighter fractions being at least partially condensed in said shell means when said heating means is rendered inoperative, the condensate thus formed returning to said phases in said closed shell means; means for removing from said closed shell means any material not condensed therein when said shell means cools; and means for withdrawing said phases from said shell means.

9. In a device for quantitatively and qualitatively determining the phases of an emulsion, the combination of: closed shell means containing a predetermined quantity of said emulsion; means for heating said emulsion while in said shell means sufficiently to drive off certain of the lighter fractions, said lighter fractions being confined in said shell means to increase the pressure therein; means for establishing an electric field in said shell means of sufficient intensity to coalesce the dispersed phase of said emulsion and thereby allow gravitational separation of the emulsion phases in said closed chamber; means for cooling at least a portion of said closed shell means to condense at least a portion of said lighter fractions thus decreasing the pressure in said shell means; and means for withdrawing said phases from said shell means.

10. In a device for quantitatively and qualitatively determining the phases of an emulsion, the combination of: closed shell means containing a predetermined quantity of said emulsion; means for heating said emulsion while in said shell means sufficiently to drive off certain of the lighter fractions, said lighter fractions being confined in said shell means to increase the pressure therein; means for establishing an electric field in said shell means of sufficient intensity to coalesce the dispersed phase of said emulsion and thereby allow gravitational separation of the emulsion phases in said closed chamber; means for cooling said shell means to condense at least a portion of said lighter fractions thus decreasing the pressure in said shell means; means for removing from said closed shell means any material not condensed therein when said shell means cools; and means for withdrawing said phases from said shell means.

11. In a device for quantitatively and qualitatively determining the phases of an emulsion, the combination of: walls defining a closed treating space capable of withstanding pressure and containing a predetermined quantity of said emulsion; means for treating said emulsion to coalesce the dispersed phase thereof and for liberating gaseous products, said means including means for establishing an electric field in said closed treating space; and a condenser above said treating space and receiving said gaseous products and cooling these gaseous products to form a condensate which drains into said treating space to reunite with the phases of said emulsion.

12. A method of quantitatively or qualitatively testing an emulsion by the use of a container providing a closed chamber from which no emulsion constituents escape during the testing operations, which method includes the steps of: confining a predetermined quantity of said emulsion in said closed chamber; externally heating said container to increase the pressure therein; establishing an electric field in said closed chamber to expel gaseous products and thus further increase the pressure in said chamber; gravitationally separating the emulsion constituents in said closed chamber; removing said externally applied heat to substantially condense said gaseous products; returning the condensate to said emulsion constituents; and separately withdrawing the emulsion constituents from said closed chamber.

13. A method of quantitatively or qualitatively testing an emulsion by the use of a means providing a closed chamber from which no emulsion constituents escape during the testing operations, which method includes the steps of: confining a predetermined quantity of said emulsion in said closed chamber; heating said emulsion to a degree insufficient to vaporize the dispersed phase thereof; establishing an electric field in said chamber of sufficient intensity to coalesce the dispersed phase and liberate gaseous products; cooling said gaseous products while in said closed chamber to form a condensate which unites with the emulsion constituents in said closed chamber; and thereafter separately withdrawing the emulsion constituents from said closed chamber.

WILLIAM WOELFLIN.